United States Patent [19]

Halter

[11] 4,060,831
[45] Nov. 29, 1977

[54] WIDEBAND ELECTROMECHANICAL RECORDING SYSTEM

[75] Inventor: Jerome Barth Halter, Indianapolis, Ind.

[73] Assignee: RCA Corporation, New York, N.Y.

[21] Appl. No.: 731,204

[22] Filed: Oct. 12, 1976

[51] Int. Cl.² .......................... H04N 5/76; G11B 3/00
[52] U.S. Cl. .............................. 358/128; 179/100.4 C; 179/100.4 M; 179/100.41 P
[58] Field of Search .................................. 358/128, 4; 179/100.4 C, 100.4 M, 100.41 P

[56] References Cited

U.S. PATENT DOCUMENTS

| | | | |
|---|---|---|---|
| 3,805,100 | 4/1974 | Klemp | 179/100.41 P |
| 3,824,352 | 7/1974 | Alder et al. | 179/100.41 P |
| 3,835,262 | 9/1974 | Moritz et al. | 179/100.4 C |
| 3,837,656 | 9/1974 | Pradervand | 179/100.4 C |
| 3,865,997 | 2/1975 | Halter | 179/100.4 C |

Primary Examiner—Raymond F. Cardillo, Jr.
Attorney, Agent, or Firm—Eugene M. Whitacre; William H. Meagher; Dilip A. Kulkarni

[57] ABSTRACT

A system for recording signals in a disc master comprises an electromechanical cutterhead responsive to the signals and a signal processing means interposed between the cutterhead and a signal source. The signals applied to the cutterhead are of the encoded type such that most of the signal energy is contained in signal components occupying a band of frequencies about one octave wide or less. The cutterhead is so constructed that its response to the signal components varies with frequency in substantial correspondence with the energy distribution of the maximum signal components over the afore-mentioned band. The signal processing means serves dual purposes. On the one hand, it cooperates with the cutterhead to provide a combined frequency response which is relatively uniform. On the other hand, it serves to reduce the energy level of high energy level signal components applied to the cutterhead. The reduction of the applied energy makes possible the use of a smaller cutterhead than would otherwise be the case. The smaller cutterhead structure, in turn, results in a relatively wide cutterhead bandwidth.

8 Claims, 7 Drawing Figures

WIDEBAND ELECTROMECHANICAL RECORDING SYSTEM

The present invention relates to a novel electromechanical recording system, and particularly to a novel electromechanical cutterhead structure suitable for recording signals having a humped energy distribution (e.g., a carrier wave frequency modulated over a frequency deviation range in representation of video information), permitting a significant increase in the bandwidth of the cutterhead without reducing the output of the cutterhead (e.g., stylus displacement).

In U.S. Pat. No. 3,842,194, issued to J. K. Clemens on Oct. 15, 1975, a video disc system is disclosed. In an arrangement therein disclosed, an information track consists of geometric variations in the bottom of a smooth spiral groove disposed on the surface of a disc record. During playback, these variations are sensed to recover the recorded information, as the disc record is rotated by a supporting turntable.

In one particularly successful format for the information track in practice of the Clemen's invention, depressed areas extending across the groove bottom alternate with non-depressed areas, where the frequency of alternation varies with the amplitude of video information subject to recording. The form of the recorded signals may be, thus, a carrier whose frequency is modulated over a frequency deviation range in representation of video information. Certain practical considerations in the recording and playback processes have led to the location of the frequency deviation range at 4.3 to 6.3 MHz, and to the limitation of baseband video information to 3 MHz, for example. With this choice of parameters, the highest significant frequency component of the recorded signal is located at 9.3 MHz (e.g., 6.3 + 3.0 MHz).

In the systems of the above-said type, in order to obtain adequate bandwidth for the signals recovered from the record during playback, (1) the disc record is rotated at relatively high playback speed (e.g., 450 rpm), and (2) the wavelength of modulation in the disc record groove is relatively short (e.g., 0.6 to 1.6 micrometers), as compared with conventional audio disc systems. Further, in order to obtain acceptable picture quality and reasonable playback time, the groove convolutions are relatively closely spaced (e.g., 5,555 gpi) in the video disc systems of the aforementioned type.

A variety of approaches to disc recording exist in the prior art. For example, one may establish the cutterhead principal resonant frequency at a frequency much higher than the highest significant frequency component of the recorded signal to obtain a relatively flat frequency response over the frequency spectrum of the recorded signal. If it is desired to record video signals in the above-described format (i.e., the highest significant frequency component located at 9.3 MHz) with the afore-mentioned approach, the recorded signals must be slowed down such that the highest significant frequency component in the recorded signal is shifted to a frequency much smaller than the principal resonant frequency of the cutterhead prior to recording on a disc master which is also rotated at a corresponding reduced speed. For example, in order to record signals up to 9.3 MHz with a cutterhead which has a relatively uniform response up to 31 KHz (e.g., principal resonant frequency of 75 KHz), the recording operation must be slowed down by a factor of 300 (i.e., 9.3 MHz/31 KHz).

In other words, it would take approximately 150 hours of recording time to record a 30 minute long program. This exceptionally long recording time is impractical and costly for producing video discs for home use.

A decrease in recording time for video signals may be realized by increasing the bandwidth of the cutterhead. The increase in the bandwidth of the cutterhead can be obtained, in turn, by selecting proper architecture for the cutterhead, and by scaling the cutterhead down in size, in order to increase its principal resonant frequency. Reference may be made to U.S. Pat. No. 3,865,997 issued to J. B. Halter for an illustration of this approach.

A further increase in the bandwidth of the cutterhead is obtained by employing an unheated stylus for cutting signals in a metal disc master. Reference may be made to U.S. Patent application, Ser. No. 591,968 of J. B. Halter, for a discussion of such technique. Pursuant to this technique, a cutterhead having a thickness (excluding stylus) of the order of 0.020 inch has been constructed. This cutterhead has a relatively flat frequency response up to 1.0 MHz and has a principal resonant frequency located at 2.5 MHz. Such cutterhead will permit recording of video signals in the format described above (i.e., the highest frequency component located at 9.3 MHz) at a speed which is slowed down only by a factor of about 9 (i.e., 9.3 MHz/1.0 MHz). Although this is a very significant improvement in the recording time as compared with the earlier electromechanical recording time, it is desirable to further decrease the recording time for obvious reasons.

In order to further increase the principal resonant frequency of the cutterhead, one may further scale down the cutterhead transducer. For example, in order to record signals of the type defined above at two-times-down speed (or 2X-down speed), with the above-mentioned approach, one may scale down the transducer used for 9X-down recording by a factor of 4.5. This, however, is not desirable for a number of very important reasons. Although the sizes of the transducers used to obtain 9X-down recording with the above-mentioned approach are comparable to other units in production (e.g., audio pickups), further scaling down of these transducers would lead to serious miniaturization problems.

Numerous measurements of video recordings have indicated that a peak-to-peak cutterhead stylus displacement of 3.4 microinches provides a satisfactory recording of video signals (e.g., signal-to-noise ratio of 54 dB). It has been further found that, at operating frequencies well below the principal resonant frequency of the cutterhead, a signal level of 175 volts (RMS) will provide a peak-to-peak stylus displacement of 3.4 microinches. It should be noted that, in general, the cutterhead sensitivity well below the principal resonant frequency (i.e., displacement/voltage) is independent of the thickness of the piezoelectric element used in the cutterhead. This follows since piezoelectric element displacement is proportional to the product of the force applied to the element and compliance of the element. The force applied to the element is proportional to the electric field strength (i.e., volts per inch), which is inversely proportional to the thickness of the element. The compliance of the element is proportional to the thickness of the element. Therefore, the thickness factor cancels out, and the cutterhead output (i.e., stylus displacement) is proportional to the driving voltage (i.e., signal level) regardless of the cutterhead size.

The scaling down of transducers is additionally undesirable because, for a given signal level applied to the piezoelectric element of the cutterhead (e.g., 175 volts RMS), the smaller the piezoelectric element, the greater is the field strength (e.g., volts per inch) appearing across the piezoelectric element. It is desirable to limit the field strength applied to the piezoelectric element to some critical value for each type of the piezoelectric material used, since the dielectric losses in the piezoelectric material increase with the increase in applied field strength. The dielectric losses, along with other losses (for example, mechanical losses), result in heating of the piezoelectric element. Excessive temperature rises in the piezoelectric element would cause thermal runaway and/or depolarization of the piezoelectric material, and thereby destroying its piezoelectric properties.

An electromechanical recording system, pursuant to the principles of the present invention, permits a significant extension of the (bandwidth × output) product of the cutterhead for a given size of the cutterhead. The size of the cutterhead is chosen so that the electric field across the piezoelectric element of the cutterhead is less than the value of the critical field (determined by conditions of piezoelectric thermal runaway) for a given signal level (determined by desired signal-to-noise ratio).

A system for electromechanically recording signals, having a humped energy distribution, in a disc master includes a source for providing these signals; a cutterhead responsive to these signals for recording these signals in the disc master when relative motion is established therebetween; and means interposed between the signal source and the cutterhead for selectively processing these signals. The cutterhead is so constructed that its response to signal components varies with frequency in substantial correspondence with the energy distribution of signal components in the humped region. The selectively processing means serves dual purposes. On the one hand, it cooperates with the cutterhead to provide an overall response which is relatively flat. On the other hand, it serves to attenuate the energy level of signal components in the humped region prior to their application to the cutterhead. The attenuation of the applied energy makes possible the use of a smaller cutterhead than would otherwise be the case. The smaller cutterhead structure, in turn, results in a relatively wide cutterhead bandwidth.

Figure 1:
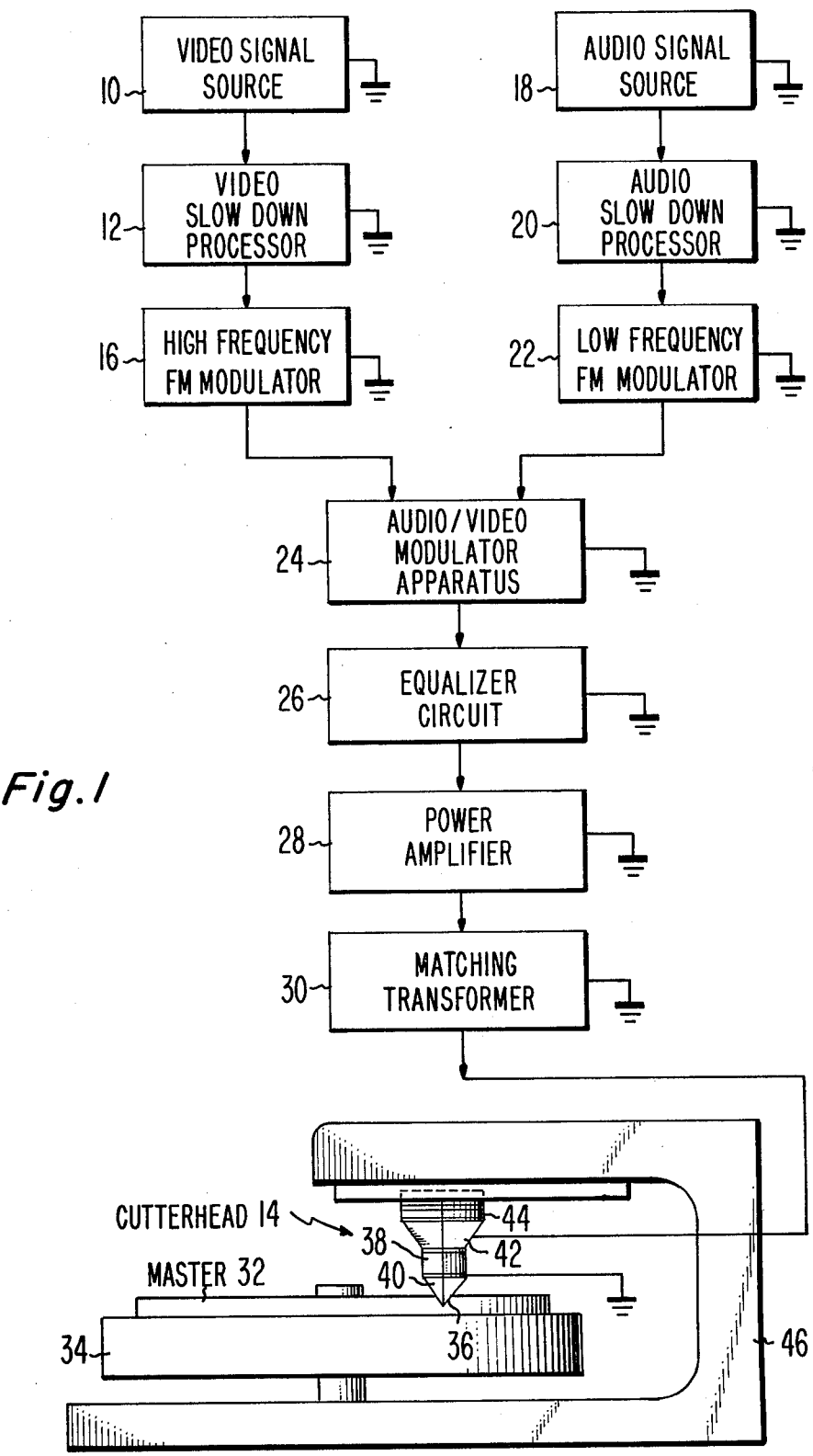
FIG. 1 illustrates, in a block diagram form, an electromechanical recording apparatus constructed in accordance with the principles of the present invention.

In the electromechanical recording system of FIG. 1, a video signal source 10 supplies a composite video signal, inclusive of luminance information and encoded chrominance information representative of a succession of scanning of colored images to be recorded, to a video slow-down processor 12. The composite color video signal supplied by the source may advantageously be in the "buried color subcarrier" format disclosed in the U.S. Pat. No. 3,872,498, issued to D. H. Pritchard, and entitled, "COLOR INFORMATION TRANSLATING SYSTEMS."

Pursuant to Pritchard's principles, a modulated color subcarrier (which may, for example, be of the general form employed in the NTSC system) is not placed at the high end of the luminance signal video band as in the NTSC system, but instead is buried within the video band. An illustrative choice for the color subcarrier frequency is in the vicinity of 1.53 MHz, with the color subcarrier sidebands extending ± 500 KHz thereabout, and with the luminance signal video band extending to 3 MHz, for example.

The video slow-down processor 12 slows down the output signal of the video signal source 10. In this particular embodiment, the output signal of the video signal source is slowed down by a factor of two (i.e., slowed down video signal extending to 1.5 MHz).

A high frequency FM modulator 16 is coupled to the output of the video slow-down processor 12. The FM modulator 16, incorporating a suitable source of high frequency oscillations, functions to develop at its output terminal a frequency modulated picture carrier signal, the instantaneous frequency thereof varying over a predetermined high frequency deviation range (e.g., 4.3/2 MHz to 6.3/2 MHz) in accordance with the amplitude of the slowed-down composite video signal (e.g., extending to 1.5 MHz) supplied by the source 10. It should be noted that, with this choice of parameters, the highest significant frequency component of the signal developed at the output of the FM modulator 16 is located at 4.65 MHz (i.e., 3.15 + 1.50 MHz).

The electromechanical recording system of FIG. 1 further includes an audio signal source 18, which supplies an audio signal, representative of a desired sound accompaniment for the colored images being recorded, to an audio slow-down processor 20. The audio slow-down processor 20 likewise slows down the output signal of the audio signal source 18 (e.g., by a factor of two) in order to correlate the audio signal to be recorded with the slowed-down video signal.

A low frequency FM modulator 22, coupled to the output of the audio slow-down processor 20, frequency modulates a slowed-down low frequency carrier over a low frequency deviation range (e.g., 716/2 ± 25 KHz) in accordance with the amplitude of the slowed-down audio signal (e.g., extending to 10 KHz) supplied by the audio slow-down processor.

The outputs of the high frequency FM demodulator 16 and the low frequency FM demodulator 22 are supplied to a modulator apparatus 24. The modulator apparatus 24 combines the outputs of two FM demodulators and supplies the combined signal to an equalizer circuit 26. The equalizer circuit 26 functions to selectively reduce the energy levels of the signal components developed at the output of the modulator apparatus. The output of the equalizer circuit is applied to a cutterhead 14 via a power amplifier 28 and a matching transformer 30.

The cutterhead 14, responsive to a relatively high frequency signal at the output of the matching transformer 30 (e.g., the highest frequency signal component occuring at 4.65 MHz), records the signal components in a disc master 32 rotatably supported by a turntable 34. The disc master 32 is rotated at a slowed-down recording speed (e.g., 450/2 rpm) while the cutterhead 14 is translated radially of the disc master in correlation with the rotational motion of the disc master, so as to record along a spiral track 36 on the disc master.

It is noted that when the signal in the aforementioned format is recorded in real time, the video and audio slow-down processors 12 and 20 would be eliminated, the high frequency FM carrier deviation range would be located at 4.3 to 6.3 MHz, the low frequency FM carrier deviation range would be located at 716 ± 50 KHz and the turntable will be rotated at 450 rpm.

Several alternative modes of operation of the modulator apparatus 24 are feasible. Reference may be made to the U.S. Pat. No. 3,911,476, issued to E. O. Keizer, entitled, "COLOR PICTURE/SOUND RECORD," for an illustration of one mode of operation of the modulator apparatus 24. Pursuant to the Keizer format, the output of the modulator apparatus 24 is an impulse train having a repetition rate corresponding to the frequency of the high frequency FM carrier (i.e., picture carrier), and having a duty cycle which varies at a rate of, and in consonance with, the low frequency FM carrier (i.e., sound carrier).

In accordance with another mode of operation of the modulator apparatus 24, the negative peak amplitudes of the high frequency FM carrier (i.e., picture carrier) are modulated in representation of the low frequency FM carrier (i.e., sound carrier), while the positive peak amplitudes of the high frequency FM carrier remain at a constant level. The vertical displacement of the recorder stylus is of the same relative polarity as that of the modulated high frequency FM carrier. The positive peaks of the high frequency FM carrier are kept at a constant level in order to prevent vertical motion of the playback stylus during playback of the recordings of the signals in this format. Reference may be made to U.S. Patent application Ser. No. 591,968, for J. B. Halter, entitled, "METHOD AND APPARATUS FOR ELECTROMECHANICAL RECORDING OF SHORT WAVELENGTH MODULATION IN A METAL MASTER," for a description of a "negative peak amplitude modulation" approach.

While the "negative peak amplitude modulation" technique requires a reasonably good amplitude linearity for the cutterhead in order to satisfactorily record the signal in the disc master, it requires relatively less bandwidth for the cutterhead. Therefore, this technique of combining the outputs of the two modulators 16 and 22 is particularly suitable for an electromechanical recording process.

The cutterhead 14 comprises a piezoelectric element 38 interposed between a stylus 40 and a pedestal 42. The pedestal 42 is secured to a carriage 44 which is movably supported on a frame 46. As previously indicated, the carriage 44 is translated along a line, passing through the center of rotation of the disc master 32, in correlation with the rotational motion of the disc master, in order to record along a spiral track on the surface of the disc master. Reference may be made to above-mentioned Halter applications for an illustration of one form of cutterhead construction.

Figure 2:
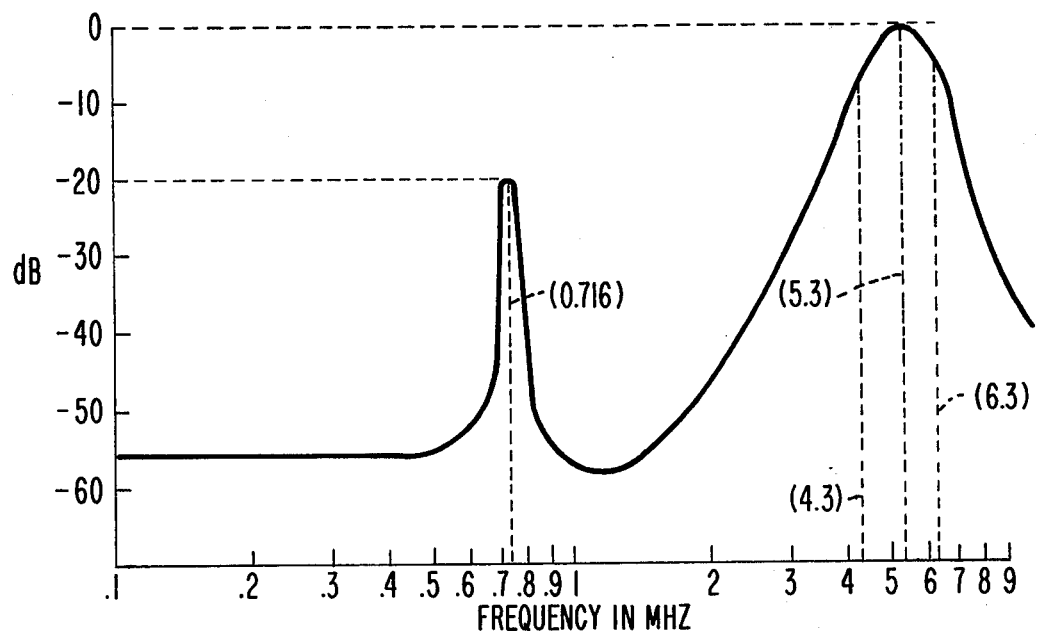
FIG. 2 illustrates a humped energy distribution of signal components suitable for real time recording.

FIG. 2 illustrates an average spectrum plot of the encoded signals in accordance with the above-mentioned Halter format that would be developed at the output of the modulator apparatus 24 in the absence of the use of the slow-down processors 12 and 20. As previously stated, for real time recording, the two slow-down processors 12 and 20 are not needed, the high frequency deviation range is located at 4.3 to 6.3 MHz, the low frequency deviation range is located at 716 ± 50 KHz, and the turntable is rotated at 450 rpm.

From FIG. 2, it will be noted that the energy level of the video signal components falls rapidly below about 4.3 MHz and above about 6.3 MHz, which are also the limits of the high frequency deviation range for real time recording. The energy spectra of the encoded video signals will vary, of course, constantly as the picture information changes. However, the bulk of the high energy level components of the encoded video signals will remain clustered in this 4.3 MHz to 6.3 MHz area, regardless of these changes in the picture information.

Figure 3:
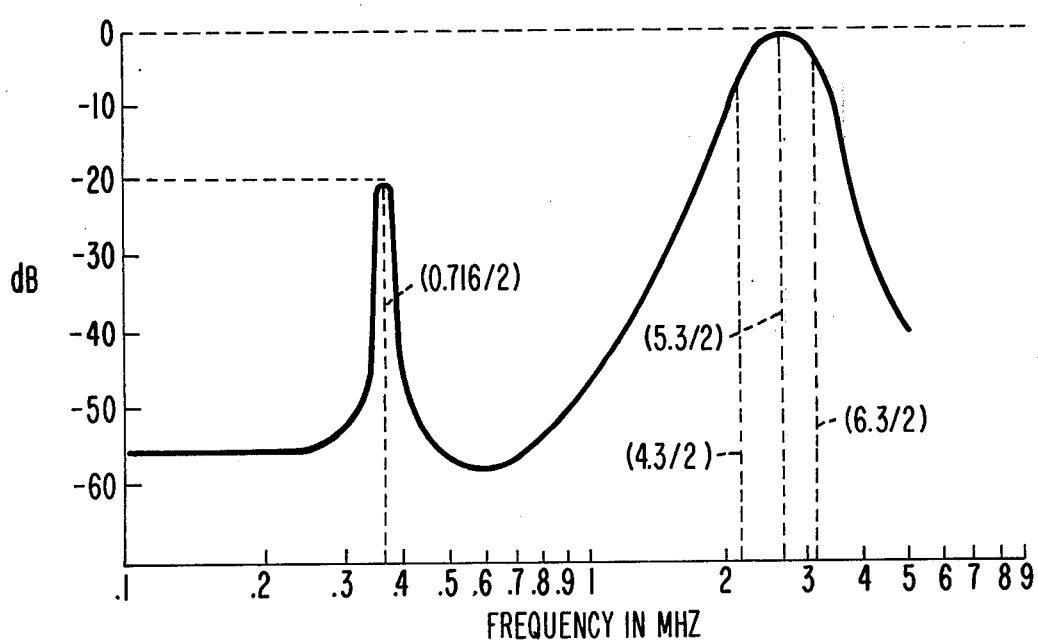
FIG. 3 shows a humped energy distribution of signal components suitable for 2X-down recording speed.

FIG. 3 shows an average spectrum plot of the encoded video signals in accordance with the afore-mentioned Halter format appearing at the output of the modulator apparatus 24, with the slow-down processors 12 and 20 employed to develop signals suitable for recording at a 2X-down recording speed. At 2X-down recording speed, most of the video energy is concentrated in the region of 2.15 MHz (i.e., 5.3/2) to 3.15 MHz (e.g., 6.3/2).

Figure 4:
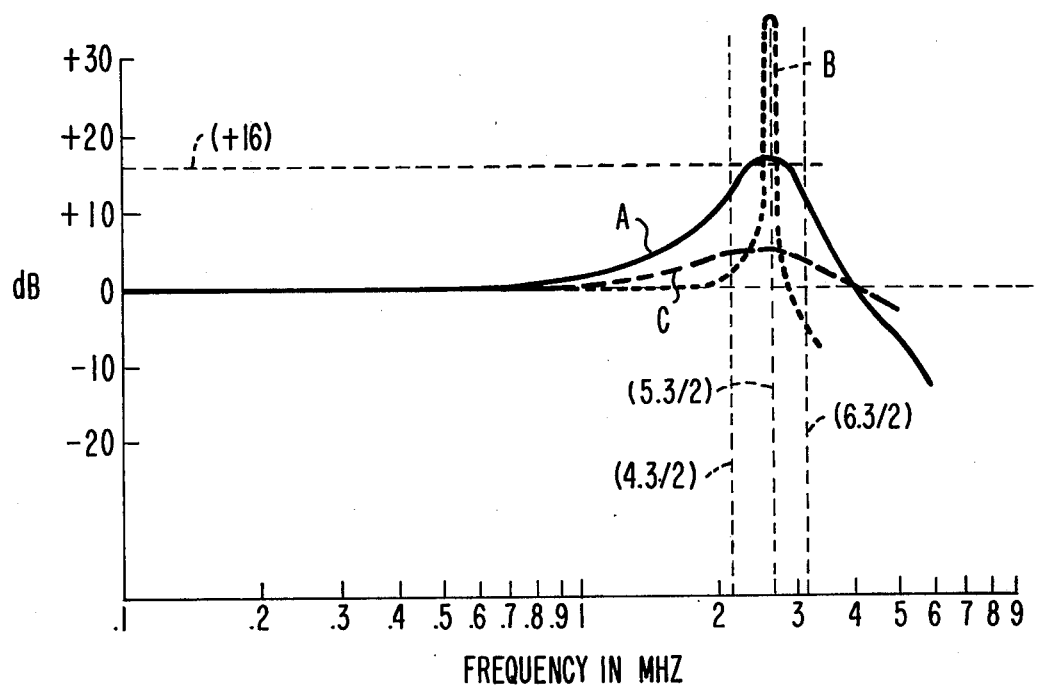
FIG. 4 is the frequency response characteristic of a cutterhead (solid curve A) suitable for use with the electromechanical recording apparatus of FIG. 1 for recording signal components at 2K-down recording speed.

The solid curve A in FIG. 4 shows the frequency response characteristic of a cutterhead 14 suitable for recording signal components of a 2X-down recording speed. Pursuant to the principles of the present invention, the cutterhead resonance is established at a frequency in the midst of the frequency band where most of the energy of the encoded video signal components occurs (i.e., 5.3/2 MHz). Further, comparing the plot of FIG. 3 and the solid curve A of FIG. 4, it will be seen that the shape of the output response of the cutterhead 14 (i.e., stylus displacement) to signal components, in the region of the resonant frequency of the cutterhead, varies with frequency in a manner that corresponds to the manner in which the energy levels of the signal components vary in that region. On the other hand, the dotted curve B and the dashed curve C illustrate response characteristics that do not match the upper portion of the spectral distribution curve of the recorded signal in this region, even though the maxima of these curves are aligned in frequency with the maximum of the spectral distribution curve. For example, the dotted curve B, while indicating greater sensitivity at resonance, is too narrow to match with the spectral distribution curve of the recorded signal, and, on the other hand, the dashed curve C does not have an adequate sensitivity at resonance and is too broad to match with the spectral distribution curve. The advantages of the alignment of the cutterhead response with the energy spectrum of the encoded signals will become clear in the discussion that follows.

Figure 5:
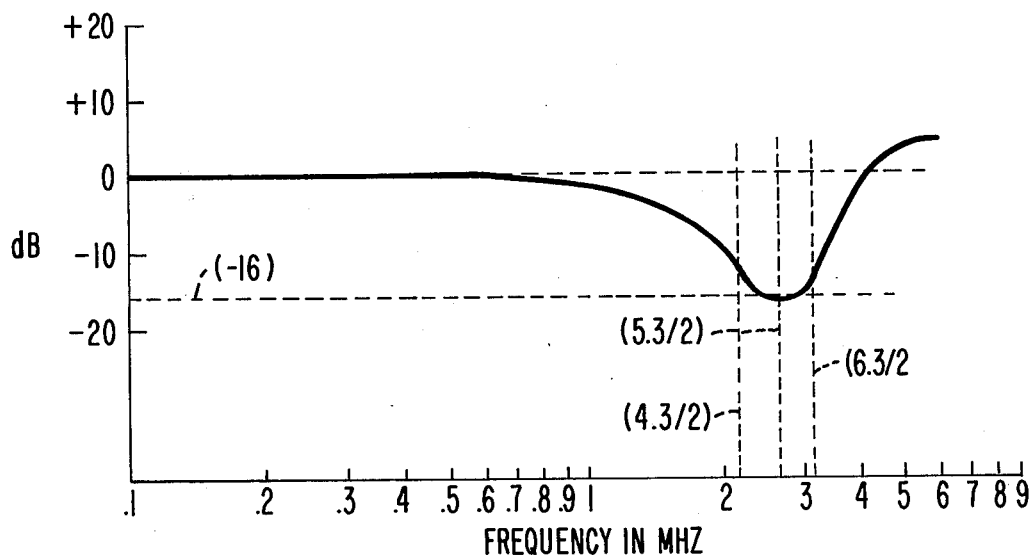
FIG. 5 is the frequency response characteristic of an equalizer circuit of FIG. 1.

FIG. 5 shows the frequency response characteristic of the equalizer circuit 26 of FIG. 1. From the comparison of FIGS. 3, 4, and 5, it will be seen that the frequency response characteristic of the equalizer circuit 26 is complementary to the frequency response characteristic of the cutterhead 14 and the spectral distribution of the higher energy level components of the encoded video signals.

Figure 6:
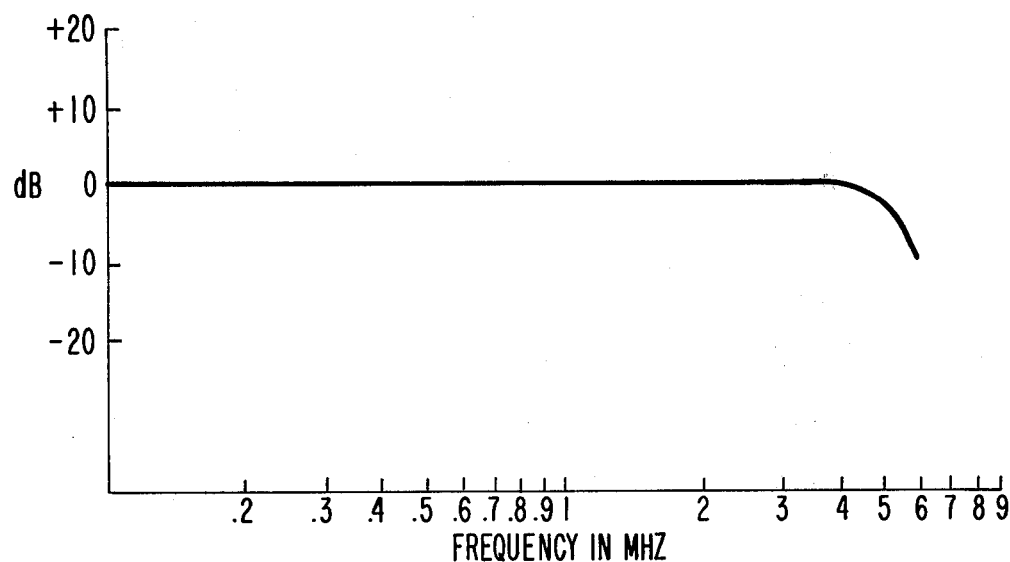
FIG. 6 is the overall frequency response characteristic of the cutterhead and the equalizer circuit of FIG. 1.
Figure 7:
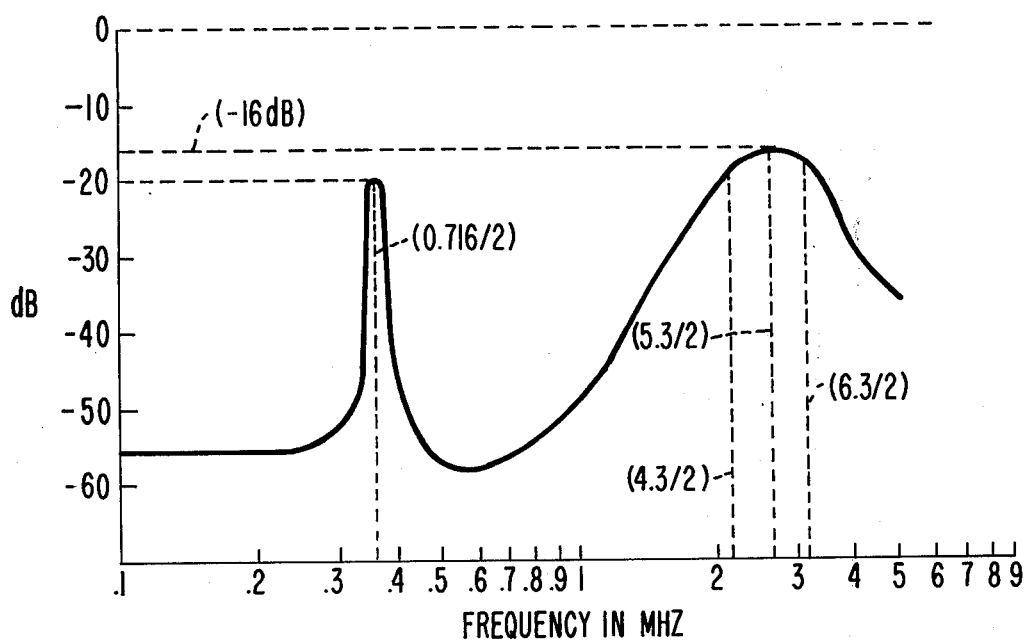
FIG. 7 is the energy distribution of signals at the input of the cutterhead of FIG. 1.

The equalizer circuit 26, pursuant to the principles of the present invention, serves dual purposes. On the one hand, it cooperates with the cutterhead 14 to provide a frequency response characteristic which is relatively flat (FIG. 6) over the bandwidth occupied by the components of the encoded video signal. On the other hand, it serves to attenuate the energy level of signal components lying in the region where most of the energy of the encoded video signal occurs (FIG. 7), thereby protecting the cutterhead from application of excessive electric fields. The attenuation of the applied energy makes possible the use of a smaller cutterhead than would otherwise be the case. The smaller cutterhead structure, in turn, results in a relatively wide cutterhead bandwidth.

As previously stated, when operating at frequencies well below the principal resonant frequency of the cutterhead, the picture carrier level (i.e., high frequency FM carrier level) is set at 175 volts (RMS) to obtain a recording having a satisfactory signal-to-noise ratio (e.g., 54 dB). Pursuant to the approach of the present invention (where the cutterhead response is aligned with the energy spectrum of the encoded signal) when the picture carrier level at the input to the equalizer circuit 26 is set to provide the same cutterhead recording level to record video signals having the spectral distribution shown in FIG. 3, the maximum voltage appearing across the cutterhead 14 is substantially reduced (e.g., to 55 volts RMS). The electric field appearing across the cutterhead 14 is also correspondingly reduced. For example, the electric field strength across the cutterhead suitable for 2X-down recording speed (e.g., a cutterhead having a thickness, excluding the stylus and the pedestal, of about 0.010 inches) is reduced by a factor of three (i.e., reduced from 17,500 volts RMS per inch to 5,500 volts RMS per inch), a substantial improvement, indeed. It should be noted that, depending on the type of piezoelectric material used, the limits for the best type of piezoelectric driver materials, to avoid thermal runaway problems, are of the order of 10,000 to 30,000 volts RMS per inch. The reduction in field strength appearing across the cutterhead is even more important when recording at real time, where the cutterhead thickness, excluding the stylus and the pedestal, is likely to be even smaller. In addition, when recording is made at real time, the mechanical losses become more important, because they are relatively higher due to the increase in recording stylus velocities, which increase with increase in signal component frequencies.

If one were to use the approach of limiting the highest significant frequency component of the recorded signal to a frequency well below the resonant frequency of the cutterhead for recording the encoded video signal in the afore-mentioned Halter format, the cutterhead 14, which has a thickness, excluding the stylus and the pedestal, of about 0.010 inches, which has a relatively uniform frequency response characteristic to 1 MHz, and whose resonant frequency is located at 2.65 MHz (e.g., 5.3/2), would be only suitable for recording at a speed which is reduced by a factor of approximately 9 relative to the real time recording speed. However, the same cutterhead pursuant to the principles of the present invention, permits recording at a speed which is reduced only by a factor of 2 relative to the real time recording speed.

If we do not align the cutterhead and equalizer in the manner described, the applied voltage to the cutterhead would have to be up to 3 times larger for the same encoded signal recording level. Then, if we also had to place the principal resonant frequency (e.g., 5.3/2 MHz) up to 4.5 times higher in frequency than the center frequency of the carrier frequency deviation range (e.g., 5.3/9 MHz) and not equalize the cutterhead, as mentioned previously, the required cutterhead thickness could be up to 4.5 times thinner. Taken together, this could mean that the permissible recording signal level may have to be limited relatively by up to $3 \times 4.5 = 13.5$ times for the same limiting value to be placed on the internal electric field for insuring stable operation. Therefore, the design of cutterheads to allow operation at the principal resonant frequencies; and the alignment of cutterhead, equalizer, and spectra characteristics, as presently discussed, have brought about a larger (signal output) X (bandwidth) product. This has made it possible to successfully record at the 2X-down speed, and it greatly improves the probabilities of recording at the real time speed.

Another advantage of aligning the cutterhead and equalizer response with that of the encoded signal spectra, as outlined above is that carrier-waveform distortion introduced in the power amplifier and/or in the cutterhead will be reduced. The equalizer precedes the power amplifier in the circuit, and so distortion introduced prior to the equalizer will not be affected, providing that the frequency components involved are within the passband of the system. However, waveform distortion of the video carrier produced in the power amplifier, the matching transformer, and the cutterhead will be reduced because the second, third, etc., harmonic components will be well down the cutterhead response curve relative to the amplitude of the video carrier fundamental which will be near the resonant peak. See FIG. 2.

Conversely, should the other design approach be used with the principal resonant peak of the cutterhead about 4.5 times higher in frequency than that of the center of the carrier-frequency-deviation band, the second and third harmonic would be accentuated since they would then be nearer to or at the cutterhead's principal resonant peak.

The novel design of the applicant's cutterhead that provides the required response characteristic is made feasible by the fact that the distribution of spectral components of the recorded signal are almost all contained within about one octave of the frequency spectrum. It can be seen from FIG. 2 that, for encoded video signals in the afore-mentioned format, the highest energy level components, that is, those which lie within 20 dB of the maximum, all fall between the 3.5 MHz and 7 MHz range (i.e., within one octave of the frequency spectrum). In such case, a cutterhead can be constructed which has significantly increased sensitivity (e.g., 10 dB or more) over a relatively small number of octaves (i.e., one octave). In other words, a cutterhead, which as a response characteristic that substantially matches the spectral distribution curve of the recorded signal over a relatively small number of octaves (e.g., 3.5 MHz to 7 MHz), can be constructed.

However, if the video baseband signal, extending from 30 Hz to 3 MHz, were recorded directly, rather than being encoded on an FM carrier as is the case here, the spectral distribution of the recorded signal would extend over many octaves of the frequency spectrum (i.e., 17 octaves). It would be very difficult to construct a cutterhead which has a significantly increased sensitivity that matches the spectral distribution of the baseband signal if it extends over this many octaves of the frequency spectrum (e.g., 17 octaves).

The audio baseband signal, extending over 20 Hz to 20 KHz occupies about 10 octaves of the frequency spectrum. Again, it would be very difficult to construct a cutterhead which has significantly increased sensitivity over this many octaves of the frequency spectrum.

When the "Q" of the resonant peak of the cutterhead is adjusted for proper results, the increased sensitivity near the resonant peak of the cutterhead will only extend over about one octave. This explains why applicant's technique of matching the cutterhead response characteristic to the spectral distribution curve of the recorded signal is particularly suitable for recording signals occupying a relatively small number of octaves (e.g., one octave).

The resonant frequency of the audio cutterhead is typically adjusted to a frequency which is about two to three times higher than the center frequency of the band of frequencies where most of the energy of the audio baseband signal occurs (i.e., 200 Hz to 500 Hz range). A narrow frequency region of attenuation of the signals applied to the audio cutterhead (e.g., 1 octave) near the principal resonant frequency of the cutterhead (due to employment, for example, of an inverse feedback circuit) does not significantly change the maximum voltage applied to the audio cutterhead, because audio baseband signal components extend over many octaves (e.g., 10 octaves).

Moreover, the construction of the cutterhead should not only provide a response characteristic that matches the upper portion of the spectral distribution curve of the recorded signal as indicated above, but should also desirably provide a satisfactory vertical motion of the recorder stylus up to and about one-half octave beyond the principal resonant frequency of the cutterhead. The cutterhead construction should be such that the unwanted horizontal motion of the recorder stylus remains but a small fraction of the vertical motion of the stylus over this range. The pyramidal, low profile cutterhead described in U.S. Patent application Ser. No. 668,981, of J. B. Halter, is particularly suitable for this task. The pyramidal, low profile construction of the afore-mentioned Halter cutterhead has adequate stiffness in the horizontal directions as well as the vertical direction, thereby permitting an effective control of the horizontal motion of the recorder stylus.

Although the applicant has herein described a 2X-down recording system, the principles of the present invention are equally applicable to a real time recording system. For example, while the cutterhead which has thickness, excluding the stylus and the pedestal, of 0.010 inches is herein used for recording at a 2X-down recording speed when the input carrier frequency deviation range, before slow-down, is located between 5.3 MHz to 6.3 MHz, the same cutterhead can as well be used for real time recording if the input carrier frequency deviation range, before slow-down, were located between 2.65 MHz to 3.15 MHz pursuant to a different signal encoding format.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to provided they fall within the scope of the invention as claimed.

What is claimed is:

1. A system for electromechanically recording signals in a disc master; the frequency spectrum of said signals having a region of relatively high energy level; said system comprising:

A. a source for supplying said signals;
   B. a cutterhead responsive to said signals for recording said signals in said disc master, when relative motion is established therebetween;
      the frequency response characteristic of said cutterhead having a region of relatively increased sensitivity surrounding the resonant frequency of said cutterhead;
   C. means for applying said signals to said cutterhead to cause said cutterhead to undergo vibrations in representation of said signals; and
   D. means interposed between said signal source and said signal applying means for selectively modifying the energy level of said signals;
      said energy level modifying means being constructed such that the shape of the frequency response characteristic of said energy level modifying means complements the shape of the frequency response characteristic of said cutterhead in said region of relatively increased sensitivity, so that the combined response of said energy level modifying means and said cutterhead is relatively uniform over said signal frequency spectrum;
   said cutterhead being constructed such that the response of said cutterhead to said signal component frequencies in said region of relatively increased sensitivity varies with frequency in a manner substantially corresponding to the manner in which the energy level of said signal components varies over said region of relatively high energy level of said signal frequency spectrum; and
   said energy level modifying means having a response characteristic that varies in a manner which is substantially the inverse of the manner in which the energy levels of said signal components vary over said region of relatively high energy level so as to substantially reduce the energy level of said high energy level signal components prior to their application to said cutterhead.

2. A system as defined in claim 1 wherein said cutterhead comprises:

A. a piezoelectric-type element responsive to said signals;
   B. a stylus secured to said piezoelectric-type element for recording said signals in said disc master when relative motion is established therebetween;
   C. a pedestal secured to said piezoelectric-type element for providing a proper cutterhead frequency response characteristic and for preventing undesirable lateral motion of said stylus; and
   D. mounting means coupled to said pedestal for disposing said stylus in a contiguous relationship to said disc master to permit recording of said signals in said disc master;
   said energy level modifying means having a response characteristic that varies in a manner which is substantially inverse of the manner in which the voltage levels of said signal components vary over said region of relatively high energy level so as to substantially reduce the voltage levels of said high energy level signal components prior to their application to said cutterhead.

3. A system for electromechanically recording signals in a disc master; the frequency spectrum of said signals having a region of relatively high energy level; said system comprising:

A. a source for supplying said signals;
B. a wideband cutterhead responsive to said signals for recording said signals in said disc master, when relative motion is established therebetween;
    the frequency response characteristic of said cutterhead having a region of relatively increased sensitivity surrounding the resonant frequency of said cutterhead;
C. means for applying said signals to said cutterhead to cause said cutterhead to undergo vibrations in representation of said signals; and
D. means interposed between said signal source and said signal applying means for selectively processing said signals;
    the frequency response characteristic of said signal processing means having a region of relatively increased attenuation in alignment with said region of relatively increased sensitivity of the frequency response characteristic of said cutterhead, so as to provide an overall frequency response characteristic which is relatively uniform over said signal frequency spectrum; and
said cutterhead and said signal processing means being constructed suth that the shape of the frequency response characteristic of said signal processing means complements the shape of the energy distribution characteristic of said signals in said region of relatively high energy level of said signal frequency spectrum, so that the energy level of said high energy level signal components is substantially reduced prior to their application to said cutterhead.

4. A system as defined in claim 3 wherein said cutterhead comprises:

A. a piezoelectric-type element responsive to said signals;
B. a stylus secured to said piezoelectric-type element for recording said signals in said disc master when relative motion is established therebetween;
C. a pedestal secured to said piezoelectrid-type element for providing a proper cutterhead frequency response characteristic and for preventing undesirable lateral motion of said stylus; and
D. mounting means coupled to said pedestal for disposing said stylus in a contiguous relationship to said disc master to permit recording of said signals in said disc master;
said signal processing means having a response characteristic that varies in a manner which is substantially inverse of the manner in which the voltage levels of said signal components vary over said region of relatively high energy level so as to substantially reduce the voltage levels of said high energy level signal components prior to their application to said cutterhead.

5. A system for electromechanically recording signals in a disc master; said signals comprising a carrier whose frequency is modulated over a frequency deviation range in representation of video information, said system comprising:

A. a source for supplying said signals;
B. a wideband cutterhead responsive to said signals for recording said signals in said disc master when relative motion is established therebetween;
    the response of said cutterhead to said signal components varying with frequency; the frequency response to said cutterhead having a region of relatively increased sensitivity surrounding the resonant frequency of said cutterhead;
C. means for applying said signals to said cutterhead to cause said cutterhead to undergo vibrations in representation of said signals; and
D. means interposed between said signal source and said signal applying means for selectively reducing the energy level of said signals;
    said energy level reducing means being constructed such that the shape of the frequency response characteristic of said energy level reducing means is inversely related to the shape of the frequency response characteristic of said cutterhead in said region of relatively increased sensitivity, so that the combined response of said energy level reducing means and said cutterhead is relatively flat in the area of said frequency deviation range;
    said cutterhead being constructed such that the principal resonant frequency of said cutterhead is substantially in alignment with the center frequency of said frequency deviation range, and such that the response of said cutterhead to said signal component frequencies in the area of said frequency deviation range varies with frequency in a manner substantially corresponding to the manner in which the energy level of said signal components varies in the area of said frequency deviation range; and
    said energy level reducing means having a response characteristic that varies in a manner which is substantially the inverse of the manner in which the energy levels of said signal components vary in the area of said frequency deviation range so as to substantially reduce the energy level of said high energy level signal components prior to their application to said cutterhead.

6. A system as defined in claim 5 wherein said cutterhead comprises:

A. a piezoelectric-type element responsive to said signals;
B. a stylus secured to said piezoelectric-type element for recording said signals in said disc master when relative motion is established therebetween; and
C. a pedestal secured to said piezoelectric-type element for providing a proper cutterhead frequency response characteristic and for preventing undesirable lateral motion of said stylus; and
D. mounting means coupled to said pedestal for disposing said stylus in a contiguous relationship to said disc master to permit recording of said signals in said disc master;
    said energy level reducing means having a response characteristic that varies in the manner which is substantially inverse of the manner in which the voltage levels of said signal components vary over said region of relatively high energy level so as to substantially reduce the voltage levels of said high energy level signal components prior to their application to said cutterhead.

7. A system for electromechanically recording signals in a disc master; said signals comprising a carrier whose frequency is modulated over a frequency deviation range in representation of video information; said system comprising:

A. a source for supplying said signals;

B. means coupled to said signal source for developing slowed-down signals such that signal components, clustered around said frequency deviation range at the input of said slowed-down signal developing means appear as signal components clustered around a modified frequency deviation range at the output of said slowed-down signal developing means;

C. a wideband cutterhead responsive to said slowed-down signals for recording said slowed-down signals in said disc master when relative motion is established therebetween;

the response of said cutterhead to said slowed-down signal components varying with frequency; the frequency response of said cutterhead having a region of relatively increased sensitivity surrounding the resonant frequency of said cutterhead;

D. means for applying said slowed-down signals to said cutterhead to cause said cutterhead to undergo vibrations in representation of said slowed-down signals; and E. means interposed between said signal source and said signal applying means for selectively reducing the energy level of said slowed-down signals;

said energy level reducing means being constructed such that the shape of the frequency response characteristic of said energy level reducing means is the inverse of the shape of the frequency response characteristic of said cutterhead in said region of relatively increased sensitivity, so that the combined response of said energy level reducing means and said cutterhead is relatively flat in the area of said modified frequency deviation range;

said cutterhead being constructed such that the principal resonant frequency of said cutterhead is substantially in alignment with the center frequency of said modified frequency deviation range, and such that the response of said cutterhead to said slowed-down signal component frequencies in the area of said modified frequency deviation range varies with the frequency in a manner substantially corresponding to the manner in which the energy level of said signal components varies in the area of said modified frequency deviation range; and said energy level reducing means having a response characteristic that varies in a manner which is substantially the inverse of the manner in which the energy levels of said signal components vary in the area of said modified frequency deviation range so as to substantially reduce the energy levels of said high energy level signal components prior to their application to said cutterhead.

8. A system as defined in claim 7 wherein said cutterhead comprises:

A. a piezoelectric-type element responsive to said signals;

B. a stylus secured to said piezoelectric-type element for recording said signals in said disc master when relative motion is established therebetween; and C. a pedestal secured to said piezoelectric-type element for providing a proper cutterhead frequency response characteristic and for preventing undesirable lateral motion of said stylus; and D. mounting means coupled to said pedestal for disposing said stylus in a contiguous relationship to said disc master to permit recording of said signals in said disc master;

said energy level reducing means having a response characteristic that varies in a manner which is substantially inverse of the manner in which the voltage levels of said signal components vary over said region of relatively high energy level so as to substantially reduce the voltage levels of said high energy level signal components prior to their application to said cutterhead.

* * * * *

UNITED STATES PATENT OFFICE
CERTIFICATE OF CORRECTION

PATENT NO. : 4,060,831

DATED : NOVEMBER 29, 1977

INVENTOR(S) : JEROME BARTH HALTER

It is certified that error appears in the above-identified patent and that said Letters Patent are hereby corrected as shown below:

Column 1, line 63      change "corresponding" to --correspondingly--

Column 3, line 60      change "2K" to --2X--

Column 8, line 57      change "as" to --has--

Column 11, line 30 [Claim 3 (D)]      change "suth" to --such--

Signed and Sealed this

Twenty-second Day of August 1978

[SEAL]

Attest:

RUTH C. MASON
*Attesting Officer*

DONALD W. BANNER
*Commissioner of Patents and Trademarks*